United States Patent
Hanyu

(10) Patent No.: US 8,264,794 B2
(45) Date of Patent: Sep. 11, 2012

(54) HEAD AND DISK DRIVE WITH SAME

(75) Inventor: Mitsunobu Hanyu, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 33 days.

(21) Appl. No.: 12/911,482

(22) Filed: Oct. 25, 2010

(65) Prior Publication Data

US 2011/0157748 A1 Jun. 30, 2011

(30) Foreign Application Priority Data

Dec. 25, 2009 (JP) .................................. 2009-296327

(51) Int. Cl.
*G11B 5/60* (2006.01)

(52) U.S. Cl. ..................................................... 360/236.3

(58) Field of Classification Search ................. 360/236.3
See application file for complete search history.

(56) References Cited

U.S. PATENT DOCUMENTS

| | | | |
|---|---|---|---|
| 5,973,881 A | 10/1999 | Ajiki | |
| 6,594,113 B2 * | 7/2003 | Rao et al. | 360/235.8 |
| 6,809,904 B2 * | 10/2004 | Boutaghou et al. | 360/235.8 |
| 6,888,693 B2 | 5/2005 | Boutaghou et al. | |
| 6,920,015 B2 * | 7/2005 | Mundt et al. | 360/235.6 |
| 6,989,965 B2 * | 1/2006 | Mundt et al. | 360/235.4 |
| 6,999,282 B2 * | 2/2006 | Rao | 360/236 |
| 7,099,114 B2 * | 8/2006 | Kang | 360/235.6 |
| 7,245,455 B2 * | 7/2007 | Rajakumar | 360/235.8 |
| 7,262,937 B2 * | 8/2007 | Pendray et al. | 360/235.1 |
| 7,499,245 B2 * | 3/2009 | Ueda et al. | 360/236.3 |
| 7,502,202 B2 * | 3/2009 | Takahashi | 360/236.3 |
| 7,599,149 B2 * | 10/2009 | Kameyama | 360/236.3 |

FOREIGN PATENT DOCUMENTS

| | | |
|---|---|---|
| JP | 10-255426 | 9/1998 |
| JP | 2004-111019 A | 4/2004 |
| JP | 2004-164685 A | 6/2004 |
| JP | 2004-164771 | 6/2004 |
| JP | 2008-071453 A | 3/2008 |
| WO | WO 2006/080266 A1 | 8/2006 |
| WO | WO 2009/087841 A1 | 7/2009 |

OTHER PUBLICATIONS

Notice of Reasons for Rejection mailed Feb. 8, 2011, for Japanese Application No. 2009-296327.

* cited by examiner

*Primary Examiner* — Mark Blouin
(74) *Attorney, Agent, or Firm* — Knobbe Martens Olson & Bear LLP

(57) ABSTRACT

According to one embodiment, a facing surface of a slider of a head includes a leading step on an inflow side of the slider, a leading pad on the leading step, a pair of side steps extending in a first direction from the leading step toward an outflow end of the slider and opposed to each other across a space in a second direction, side pads provided on the side steps to be continuous with the side pads, individually, a trailing step located on an outflow side of the airflow and provided with a head section, and induction grooves continuously extending from the leading pad to the side pads, individually, and configured to guide introduced airflow.

18 Claims, 7 Drawing Sheets

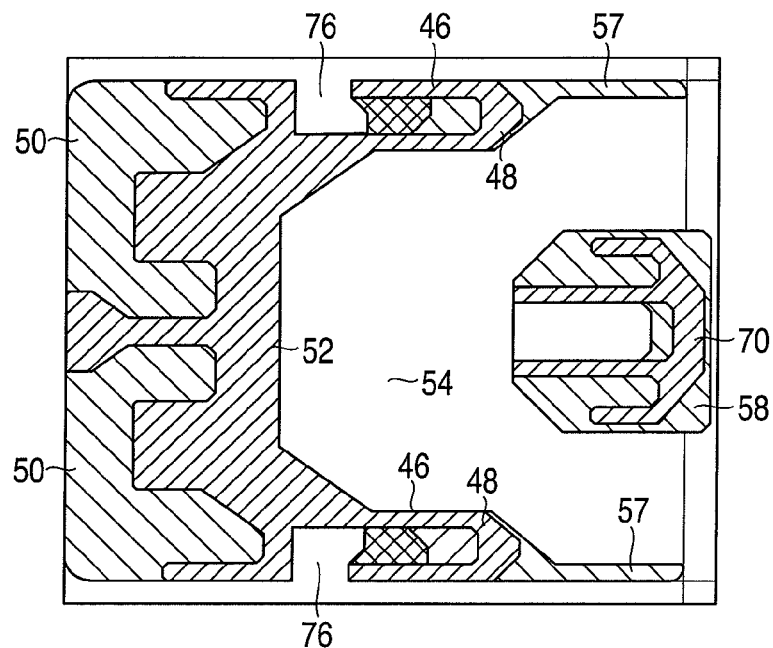
(Comparative Example 1)
F I G. 6
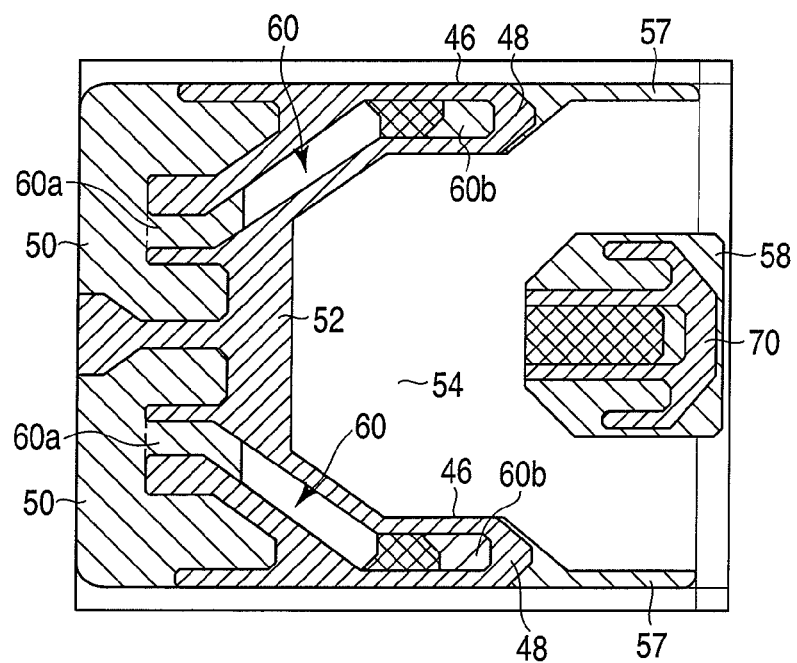
F I G. 7

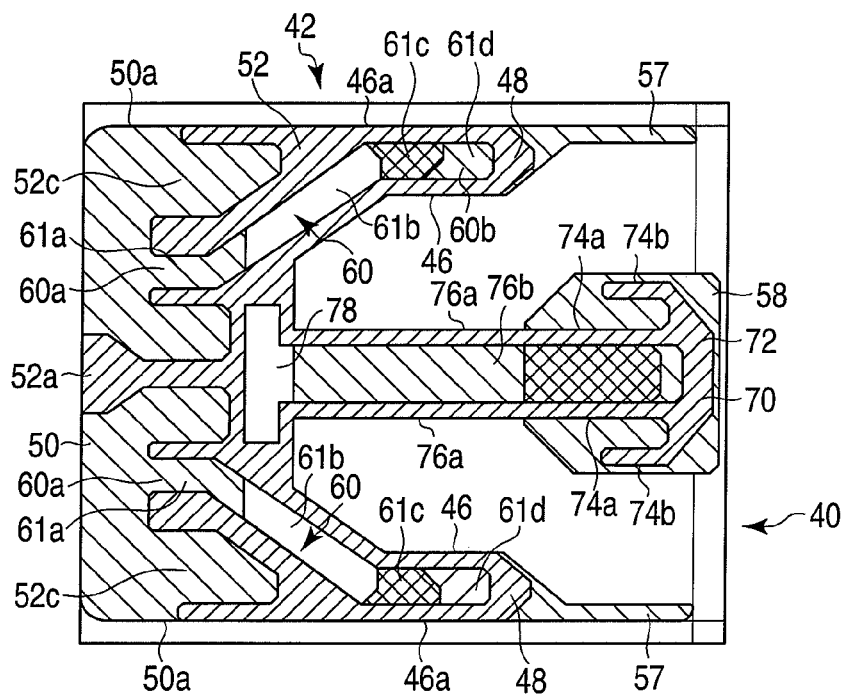
F I G. 10
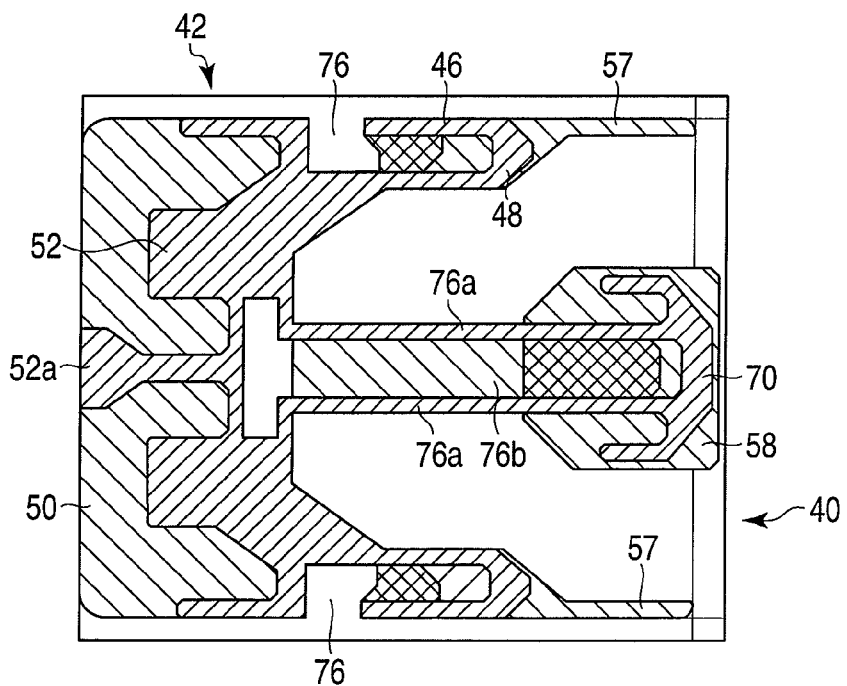
(Comparative Example 2)
F I G. 11

HEAD AND DISK DRIVE WITH SAME

CROSS-REFERENCE TO RELATED APPLICATIONS

This application is based upon and claims the benefit of priority from Japanese Patent Application No. 2009-296327, filed Dec. 25, 2009; the entire contents of which are incorporated herein by reference.

FIELD

Embodiments described herein relate generally to a head used in a disk drive, such as a magnetic disk drive, and the disk drive provided with the head.

BACKGROUND

A disk drive, such as a magnetic disk drive, comprises a magnetic disk, spindle motor, magnetic head, and carriage assembly. The magnetic disk is disposed in a base. The spindle motor supports and rotates the disk. The magnetic head reads and writes data from and to the disk. The carriage assembly supports the head for movement relative to the disk. The carriage assembly comprises a pivotably supported arm and a suspension extending from the arm, and the magnetic head is supported on an extended end of the suspension. The head comprises a slider mounted on the suspension and a head section mounted on the slider. The head section comprises a reproduction element for reading and a recording element for writing.

The slider has a facing surface or air-bearing surface (ABS) opposed to a recording surface of the magnetic disk. When the disk drive is actuated, airflow is produced between the rotating disk and slider. Thereupon, the facing surface of the slider is subjected to a force (positive pressure) that causes the slider to fly above the recording surface of the disk, based on the principle of air lubrication. By balancing this flying force and a head load, the slider can be caused to fly with a gap above the disk surface.

A slider comprising a center-rail ABS has recently been proposed as a magnetic disk slider (e.g., U.S. Patent Application Publication No. US2004/0150916A1). This slider is designed so that a groove that guides airflow from an air inflow end to an outflow end is disposed along its central axis, whereby a pressure produced by an outflow pad can be increased. Thus, various properties of the slider, such as a reduction in flying height due to a pressure reduction, vibration caused by sudden disturbance, etc., are improved.

In the magnetic head constructed in this manner, a higher rate of airflow to the outflow pad may increase the possibility of dust, contaminants, etc., getting into a space between the slider and disk, thereby damaging the disk and degrading the head performance.

BRIEF DESCRIPTION OF THE DRAWINGS

A general architecture that implements the various feature of the embodiments will now be described with reference to the drawings. The drawings and the associated descriptions are provided to illustrate the embodiments and not to limit the scope of the invention.

FIG. 6 is an exemplary plan view showing a slider according to Comparative Example 1 comprising no induction grooves but having an opening in an outside edge of each side step;

FIG. 7 is an exemplary plan view showing the slider of the magnetic head according to the first embodiment;

FIG. 10 is an exemplary plan view showing a magnetic head of an HDD according to a second embodiment;

FIG. 11 is an exemplary plan view showing a center-rail slider according to Comparative Example 2 comprising no induction grooves but having an opening in an outside edge of each side step;

DETAILED DESCRIPTION

Various embodiments will be described hereinafter with reference to the accompanying drawings. In general, according to one embodiment, a head comprises a slider comprising a facing surface opposed to a surface of a rotatable recording medium; and a head section on the slider, configured to record and reproduce data on and from the recording medium. The facing surface of the slider has a first direction along airflow and a second direction perpendicular to the first direction. The facing surface of the slider comprises a leading step on an inflow side of the slider, a leading pad on the leading step, a pair of side steps extending from the leading step toward an outflow end of the slider and opposed to each other across a space in the second direction, side pads on the side steps to be continuous with the leading pad, individually, a trailing step on an outflow side of the slider, provided with the head section, and induction grooves continuously extending from the leading pad to the side pads, individually, and configured to guide introduced airflow.

Embodiments in which disk drives are applied to hard disk drives (HDDs) will now be described in detail with reference to the accompanying drawings.

Figure 1:
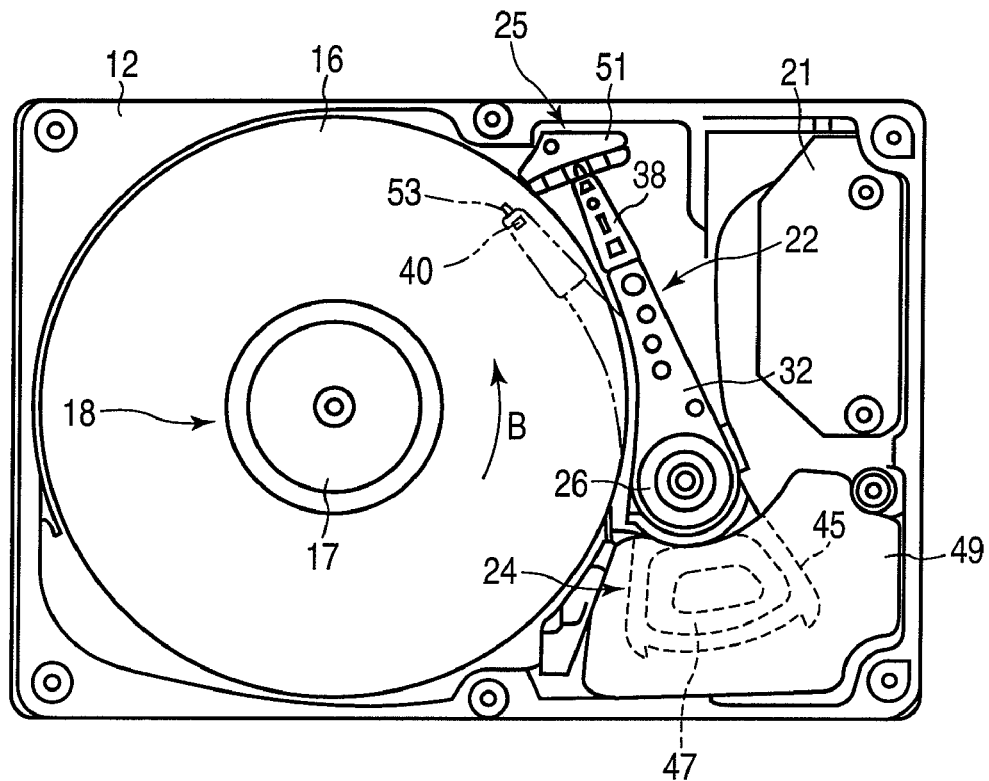
FIG. 1 is an exemplary plan view showing an HDD according to a first embodiment.

FIG. 1 shows the internal structure of an HDD according to a first embodiment with its top cover off. As shown in FIG. 1, the HDD comprises a case, which comprises a base 12 in the form of an open-topped rectangular box and a top cover (not shown). The top cover is attached to the base by screws so as to close the top opening of the base.

The base 12 contains a magnetic disk 16 for use as a recording medium, spindle motor 18, magnetic heads 40, carriage assembly 22, voice coil motor (VCM) 24, ramp load mechanism 25, board unit 21, etc. The spindle motor 18 serves as a drive unit that supports and rotates the magnetic disk. The magnetic heads 40 write and read data to and from the disk. The carriage assembly 22 supports the heads for movement relative to the disk 16. The VCM 24 pivots and positions the carriage assembly. The ramp load mechanism 25 holds the magnetic heads in positions off the magnetic disk when the heads are moved to the outermost periphery of the disk. The board unit 21 comprises a head IC and the like. The carriage assembly 22 and VCM 24 constitute a head actuator.

A printed circuit board (not shown) is attached to the outer surface of a bottom wall of the base 12 by screws. This circuit board controls the operations of the spindle motor 18, VCM 24, and magnetic heads 40 through the board unit 21.

The magnetic disk 16 comprises magnetic recording layers on its upper and lower surfaces, individually. The disk 16 is fitted on a hub (not shown) of the spindle motor 18 and secured to the hub by a clamp spring 17. The disk 16 is rotated at a predetermined speed in the direction of arrow B by the spindle motor 18.

The carriage assembly 22 comprises a bearing unit 26 secured to the bottom wall of the base 12 and a plurality of arms 32 extending from the bearing. The arms 32 are arranged parallel to the surfaces of the magnetic disk 16 and at predetermined intervals and extend in the same direction from the bearing unit 26. The carriage assembly 22 comprises elastically deformable suspensions 38 each in the form of an elongated plate. Each suspension 38 is formed of, for example, a plate spring, whose proximal end is secured to the distal end of its corresponding arm 32 by spot welding or adhesive bonding and which extends from the arm. Alternatively, each suspension 38 may be formed integrally with its corresponding arm 32. Each arm 32 and its corresponding suspension 38 constitute a head suspension, and the head suspension and each magnetic head 40 constitute a head suspension assembly.

Figure 2:
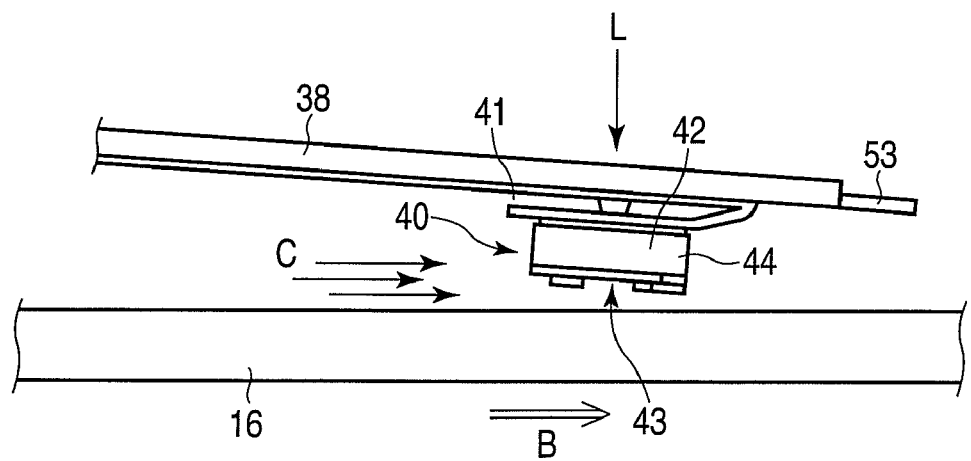
FIG. 2 is an exemplary enlarged side view showing a magnetic head of the HDD and its surroundings.

As shown in FIG. 2, each magnetic head 40 comprises a substantially cuboid slider 42 and read/write head section 44 provided on the slider. Each head 40 is secured to a gimbal spring 41 on the distal end portion of each corresponding suspension 38. A head load L directed to the surface of the magnetic disk 16 is applied to each head 40 by the elasticity of the suspension 38.

As shown in FIG. 1, the carriage assembly 22 comprises a support frame 45 extending from the bearing unit 26 on the side opposite from the arms 32. The support frame supports a voice coil 47, which constitutes a part of the VCM 24. The support frame 45 is formed integrally with the outer periphery of the voice coil 47 from a synthetic resin. The voice coil 47 is located between a pair of yokes 49 that are secured to the base 12. Thus, the voice coil, along with the yokes and a magnet (not shown) secured to the yokes, constitutes the VCM 24. If the voice coil 47 is energized, the carriage assembly 22 pivots around the bearing unit 26, whereupon each magnetic head 40 is moved to and positioned on a desired track of the magnetic disk 16.

The ramp load mechanism 25 comprises a ramp 51 and tabs 53 (FIG. 2). The ramp 51 is located on the bottom wall of the base 12 and located outside the magnetic disk 16. Each tab 53 extends from the distal end of each corresponding suspension 38. If the carriage assembly 22 pivots to a retracted position outside the disk 16, each tab 53 engages with a ramp surface formed on the ramp 51 and is then pulled up along the slope of the ramp surface. The magnetic heads 40 are unloaded in this manner.

Figure 3:
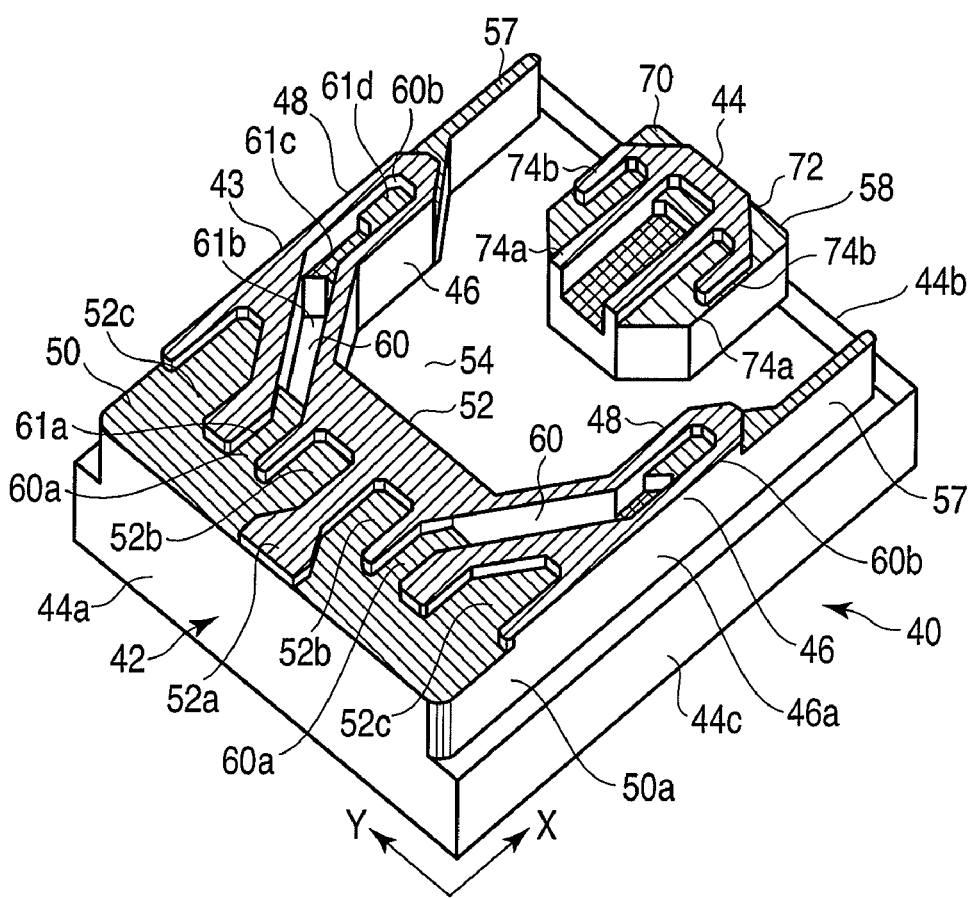
FIG. 3 is an exemplary perspective view showing the disk-facing side of a slider of the head.
Figure 4:
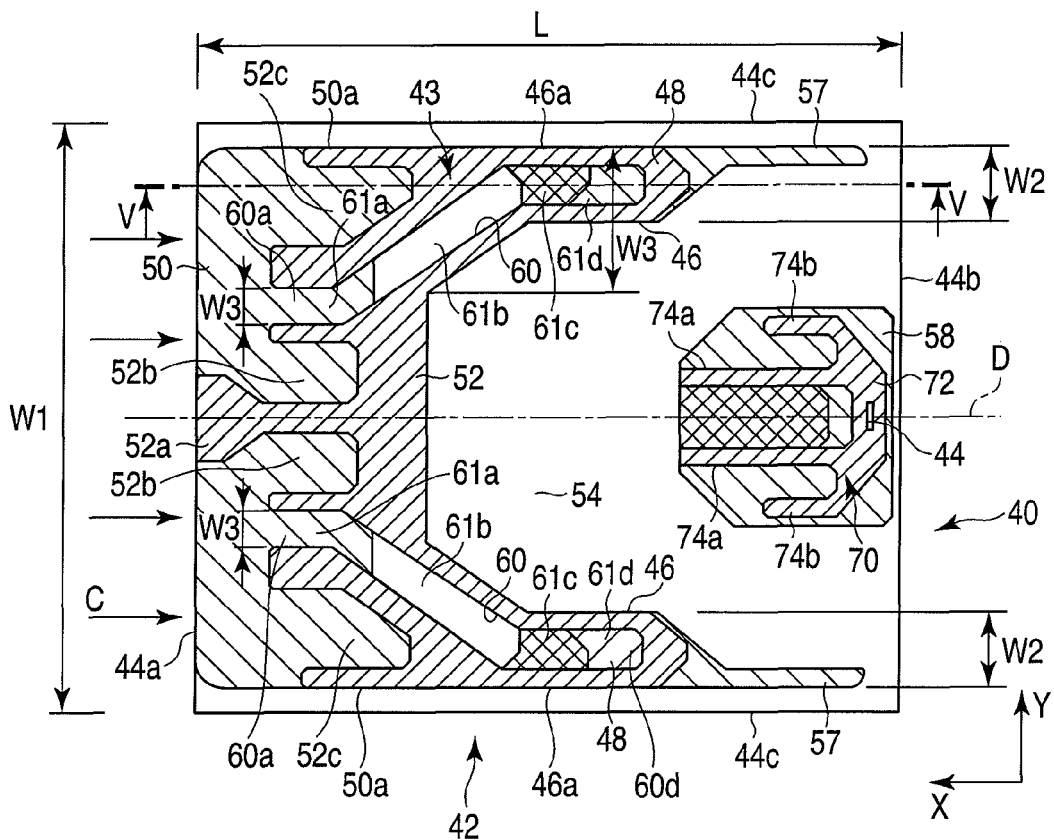
FIG. 4 is an exemplary plan view showing the disk-facing side of the slider.
Figure 5:
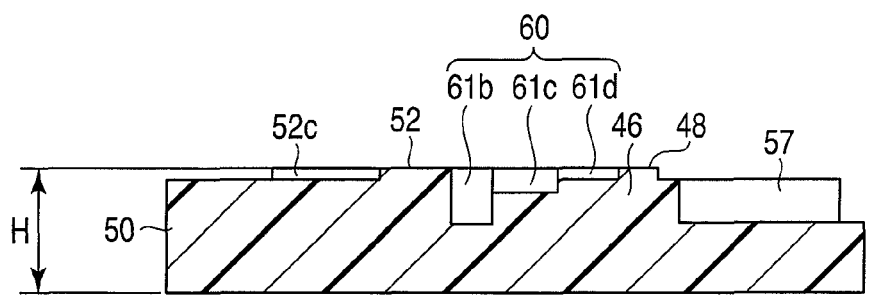
FIG. 5 is an exemplary sectional view of the slider taken along line V-V of FIG. 4.

The following is a detailed description of a configuration of each magnetic head 40. FIG. 3 is an exemplary perspective view showing the slider of the head, FIG. 4 is an exemplary plan view of the slider, and FIG. 5 is an exemplary sectional view of the slider.

As shown in FIGS. 2 to 5, each magnetic head 40 comprises the substantially cuboid slider 42, which has a rectangular disk-facing surface or air-bearing surface (ABS) 43, inflow end face 44a, outflow end face 44b, and a pair of side faces 44c. The ABS 43 is configured to face the surface of the magnetic disk 16. The inflow and outflow end faces 44a and 44b extend at right angles to the disk-facing surface. The side faces 44c extend at right angles to the disk-facing surface between the inflow and outflow end faces 44a and 44b.

The longitudinal direction of the ABS 43 is defined as a first direction X, and the transverse direction perpendicular thereto as a second direction Y. The slider 42 is formed as a femto slider, having length L of 1.25 mm or less, e.g., 0.85 mm, in the first direction X and width W1 of 1.0 mm or less, e.g., 0.7 mm, in the second direction Y.

Each magnetic head 40 is formed as a flying head, and the slider 42 is caused to fly by airflow C that is produced between the disk surface and the ABS 43 as the magnetic disk 16 rotates. When the HDD is operating, the ABS 43 of the slider 42 never fails to be opposed to the disk surface across a gap. The direction of airflow C is coincident with a direction of rotation B of the disk 16. The slider 42 is located above the surface of the disk 16 in such a manner that the first direction X of the ABS 43 is substantially coincident with the direction of airflow C.

As shown in FIGS. 3 to 5, a negative-pressure cavity 54, a recess, is formed in the ABS 43, ranging from its substantially central part to the outflow end side. The cavity 54 opens toward the outflow end face 44b. Thickness H of the slider 42 is adjusted to, for example, 0.23 mm, and the depth of the cavity 54 to 800 to 1,500 nm, e.g., to 1,500 nm. By means of the cavity 54, a negative pressure can be produced on the central part of the ABS 43 at every feasible yaw angle for the HDD.

A substantially rectangular leading step 50 is formed at an inflow end portion of the ABS 43. The leading step 50 is one level (e.g., 100 nm) lower than the ABS 43, projects above the bottom surface of the negative-pressure cavity 54, and is located on the inflow side of the cavity 54 with respect to airflow C.

The ABS 43 comprises a pair of side steps 46, which extend individually along its side edges and face each other across a space in the second direction Y. The side steps 46 project above the bottom surface of the negative-pressure cavity 54. The side steps 46 extend on the downstream-end side of the slider 42 from the leading step 50.

An outside edge 46a of each side step 46 extends continuously with an outside edge 50a of the leading step 50 in the first direction X without comprising an opening. The width of each side step 46 in the second direction extends from its outflow end portion to the leading step 50. In this case, second-direction width W2 of a substantially half part of each side step 46 on the outflow end side is smaller than half-width W3 on the inflow side.

The leading step 50 and side steps 46 are arranged symmetrically with respect to central axis D of the slider 42, and form a substantially U-shaped structure as a whole, closed on the upstream side and opening downstream. The leading step 50 and side steps 46 constitute the negative-pressure cavity 54.

In order to maintain the pitch angle of each magnetic head 40, a leading pad 52 that supports the slider 42 by means of an air film is formed protruding from the leading step 50. The leading pad 52 continuously extends throughout the width of the leading step 50 in the second direction Y and is deviated downstream from the inflow end face 44a of the slider 42.

The leading pad 52 comprises a rib 52a that extends along central axis D from its central part to an inflow end face of the leading step. A plurality (e.g., two) of recesses 52b and 52c are formed in that part of the leading pad 52 which is located on each of opposite sides of the rib 52a. The recesses 52b and 52c open toward the inflow end of the leading pad 52.

A side pad 48 is formed on each side step 46 and connects with the leading pad 52. The leading pad 52 and side pads 48 are substantially flat and form the ABS 43.

The slider 42 comprises induction grooves 60 that continuously extend from the leading pad 52 to the respective outflow ends of the side pads 48 and serve to guide introduced airflow. Each induction groove 60 comprises an inflow end portion 60a, which opens on the side of the leading step 50, and an outflow end portion 60b opening on the outflow end side of each corresponding side step 46. Each groove 60 has substantially fixed width W3 from the inflow end portion to the outflow end portion. The inflow end portion 60a of each induction groove 60 is biased and located nearer to the central part of the slider 42 than the outflow end portion 60b. Each induction groove 60 extends inclined outwardly relative to the first direction X. Second-direction width W3 of each induction groove 60 is set to be 6 to 30% of second-direction width W1 of the leading step 50.

Each induction groove 60 is formed by connecting a plurality of grooves of different depths. In the present embodiment, each induction groove 60 is formed by connecting a shallow first groove 61a, deeper second groove 61b, third groove 61c intermediate in depth between the first and second ones, and fourth groove 61d shallower than the third one. These grooves 61a to 61d are sequentially arranged from the inflow end side of the leading pad 52 toward the outflow end of each corresponding side step 46 in the order named.

As shown in FIGS. 3 to 5, the ABS 43 of the slider 42 is formed with a pair of skirt portions 57, which linearly extend in the first direction X from their corresponding side steps 46 toward the outflow end of the slider. Each skirt portion 57 is formed deeper than each side step 46 and protrudes from the bottom surface of the negative-pressure cavity 54. Each skirt portion 57 is formed 100 to 200 nm, e.g., 100 nm, deeper than the ABS 43.

The slider 42 comprises a trailing step 58 formed on the outflow end portion of the ABS 43 with respect to the direction of airflow C. The trailing step 58 protrudes from the bottom surface of the negative-pressure cavity 54, and the height of its projection is equal to that of the leading step 50. In other words, the depth of the trailing step 58 below the ABS 43 is equal to that of the leading step 50, that is, 50 to 250 nm, e.g., 100 nm. The trailing step 58 is located downstream relative to the negative-pressure cavity 54 with respect to the direction of airflow C and substantially in the center of the ABS 43 with respect to the second direction Y. Further, the trailing step 58 is slightly biased toward the inflow end face 44a of the slider 42 from the outflow end face 44b.

As shown in FIGS. 3 to 5, the trailing step 58 is a substantially cuboid structure, two upstream corner portions of which are chamfered. The trailing step 58 has an upper surface opposed to the surface of the magnetic disk 16.

A trailing pad 70 that supports the slider 42 by means of an air film protrudes from the upper surface of the trailing step 58. The trailing pad 70 is formed flush with the leading pad 52 and side pads 48 and its surface constitutes the ABS 43.

The trailing pad 70 comprises a base portion 72 at the outflow end of the trailing step 58 and four ribs 74a and 74b, which extend in the second direction Y from the base portion toward the inflow end. On the trailing step 58, the base portion 72 is arranged on the central axis on the outflow end side and located substantially in the center with respect to the second direction Y. The two ribs 74a located individually on the opposite sides of central axis D extend in the first direction X from the base portion 72 to the inflow end of the trailing step 58. The two outside ribs 74b are shorter than the ribs 74a and extend in the first direction X from the base portion 72 toward the inflow end of the trailing step 58. That part of the trailing step 58 which is located between the two longer ribs 74a is formed one level lower than other parts.

The head section 44 of each magnetic head 40 comprises recording and reproduction elements for recording and reproducing data on and from the magnetic disk 16. These elements are embedded in the downstream end portion of the slider 42 with respect to the direction of airflow C. The recording and reproduction elements are arranged so that their respective lower ends are exposed on the base portion 72 of the trailing pad 70.

According to the HDD constructed in this manner, each magnetic head 40 is caused to fly by airflow C that is produced between the disk surface and the ABS 43 as the magnetic disk 16 rotates. Thus, when the HDD is operating, the ABS 43 of the slider 42 never fails to be opposed to the disk surface across a gap. As shown in FIG. 2, each magnetic head 40 flies in such an inclined attitude that a read/write gap of the head section 44 is located closest to the disk surface.

Each magnetic head 40, which comprises the negative-pressure cavity 54 in the ABS 43 of the slider 42, can produce a negative pressure on the central part of the ABS 43 at every feasible yaw angle for the HDD. Further, the induction grooves 60 are provided continuously extending from the leading pad of the leading step to the respective outflow ends of the side pads of the side steps. These induction grooves 60 can guide a part of introduced airflow to the side steps 46 on the opposite sides. Thereupon, the amount of air delivered to the trailing step 58 and head section 44 can be reduced, so that dust, contaminants, etc., can be prevented from getting into a space between the head section 44 and the magnetic disk. Thus, damage to the magnetic disk and reduction in the performance of the magnetic heads can be prevented.

Further, the roll rigidity of the slider 42 can be greatly improved by guiding a part of airflow collected on the leading edge side (inflow end side) of the slider to the side pads 48 through the induction grooves 60. Thus, variation of the flying height due to a manufacture/assembly tolerance in a rolling direction (based on the roll static attitude (RSA) of each suspension or caused when the slider is affixed to the suspension) can be reduced, so that the yield of product and reliability can be improved.

Accordingly, there may be provided a head and HDD with improved reliability and stability, capable of suppressing penetration of dust, contaminants, etc.

Figure 8:
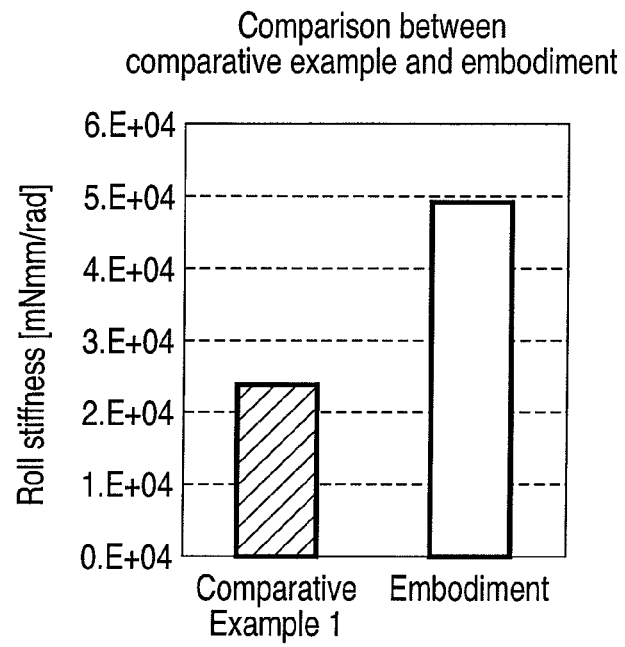
FIG. 8 is an exemplary diagram comparatively showing the respective roll rigidities of the magnetic heads according to the first embodiment and Comparative Example 1.

The inventor hereof prepared the magnetic head according to the present embodiment shown in FIG. 7 and a magnetic head comprising a slider according to Comparative Example 1 having an opening in an outside edge of each side step and comprising no induction grooves, as shown in FIG. 6, and measured and compared their respective roll rigidities. The comparison was made by simulation after the respective flying height-attitudes of these two magnetic heads were aligned (with an element unit flying height of 10 nm, 1,110-urad pitch, 0-urad roll, peripheral speed of 12.2 m/s, and 2.5-inch middle circumference of the HDD). FIG. 8 shows the result of this comparison.

As seen from FIG. 8, the roll rigidity of the magnetic head of the present embodiment is 2.1 times higher than that of Comparative Example 1.

Figure 9:
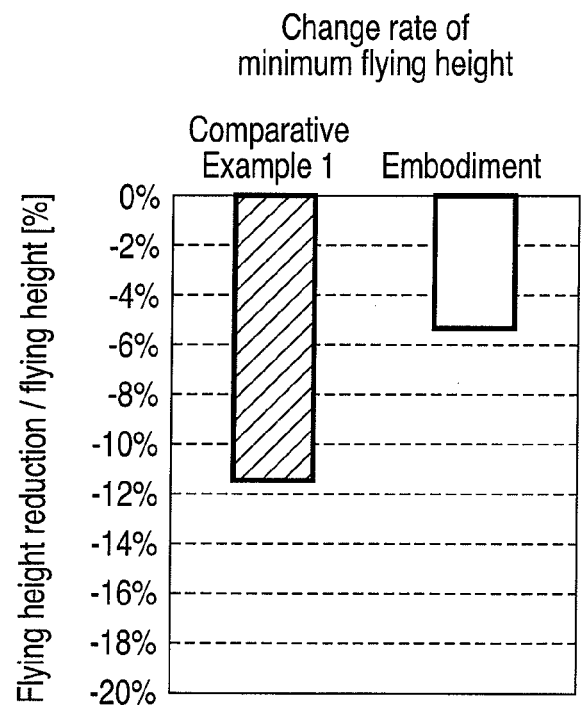
FIG. 9 is an exemplary diagram comparatively showing the respective change rates of minimum flying height of the magnetic heads according to the first embodiment and Comparative Example 1.

Further, a flying height analysis was made on the magnetic heads according to Comparative Example 1 and the present embodiment for a change of the roll static attitude (RSA) of each suspension to check the variation of the flying height for reduction due to the improved roll rigidity. FIG. 9 shows the result of this analysis. As seen from FIG. 9, the flying height reduction rate of the magnetic head according to the present embodiment is about 40% higher than that of Comparative Example 1.

The following is a description of a magnetic head of an HDD according to a second embodiment.

FIG. 10 shows a magnetic head 40 of the HDD according to the second embodiment. In the present embodiment, a slider 42 is formed as a center-rail slider. Specifically, the slider 42 comprises a pair of center rails 76a, which extend parallel to each other in the first direction X from a leading step 50 to a trailing step 58. The center rails 76a are formed continuous with ribs 74a of a trailing pad 70, individually. A guide groove 76b is defined between the two center rails 76a and it extends from the leading step 50 to the trailing step 58. A recess 78 is formed in that part of the leading step 50 which is located on the proximal end side of the center rails 76a. The recess 78 is formed continuous with and deeper than the guide groove 76b.

Further, the slider 42 comprises induction grooves 60 that continuously extend from the leading pad 52 to the respective outflow ends of side pads 48 and serve to guide introduced airflow. Each induction groove 60 comprises an inflow end portion 60a, which opens on the side of the leading step 50, and an outflow end portion 60b opening on the outflow end side of each corresponding side step 46. Each groove 60 has substantially fixed width W3 from the inflow end portion to the outflow end portion. The inflow end portion 60a of each induction groove 60 is biased and located nearer to the central part of the slider 42 than the outflow end portion 60b. Each induction groove extends inclined outwardly relative to the first direction X. The second-direction width of each induction groove 60 is set to be 6 to 30% of that of the leading step 50.

Each induction groove 60 is formed by connecting a plurality of grooves of different depths. In the present embodiment, each induction groove 60 is formed by connecting a shallow first groove 61a, deeper second groove 61b, third groove 61c intermediate in depth between the first and second ones, and fourth groove 61d shallower than the third one. These grooves 61a to 61d are sequentially arranged from the inflow end side of the leading pad 52 toward the outflow end of each corresponding side step 46 in the order named.

In the second embodiment, other configurations of the magnetic head 40 are the same as those of the first embodiment, so that like reference numbers are used to designate like portions throughout the several views, and a detailed description thereof is omitted. Also in the second embodiment, there may be provided a magnetic head with improved roll rigidity, and hence, improved reliability and stability, capable of suppressing penetration of dust, contaminants, etc.

Figure 12:
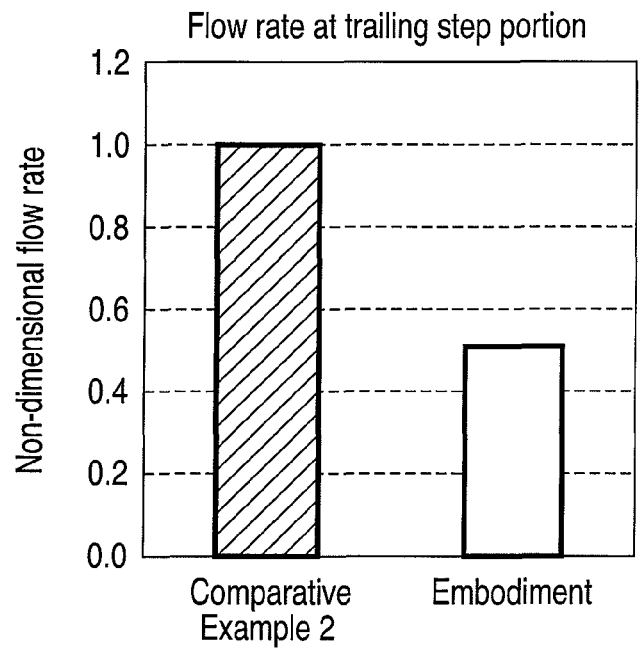
FIG. 12 is an exemplary diagram comparatively showing the flow rates of air delivered to the respective trailing steps of the magnetic heads according to the second embodiment and Comparative Example 2.

The inventor hereof prepared the magnetic head according to the second embodiment shown in FIG. 10 and a magnetic head comprising a center-rail slider according to Comparative Example 2 having an opening 76 in an outside edge of each side step and comprising no induction grooves, as shown in FIG. 11, and compared, by simulation, the flow rates of air delivered to their trailing steps. FIG. 10 shows the result of this comparison. The simulation is performed in the same analysis conditions as those of the aforementioned roll rigidity analysis. As seen from FIG. 12, the air flow rate of magnetic head 40 according to the present embodiment is reduced to about half that of Comparative Example 2.

Figure 13:
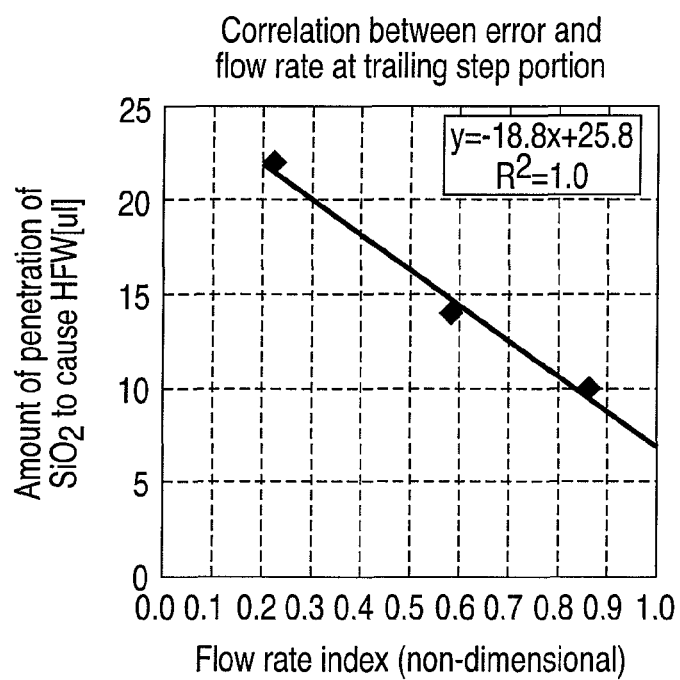
FIG. 13 is an exemplary diagram showing the relationship between the flow rate at the trailing step and the amount of contaminant ($SiO_2$) with which an error (HFW) starts to occur.

Further, the inventor hereof prepared magnetic heads of three types comprising disk-facing surfaces of different flow rates, and conducted an experiment on how actual 2.5-inch HDDs start to suffer an error based on the amount of penetration of $SiO_2$ (assumed to be a contaminant) as a parameter. FIG. 13 shows the result of this experiment. As seen from FIG. 13, a correlation was found between the air flow rate at the trailing step and the amount of penetration of $SiO_2$ that initiates an error (HFW). Consequently, it is indicated that the higher the air flow rate at the trailing step, the less the amount of introduction of $SiO_2$ that can cause an error is.

Thus, according to the magnetic head of the second embodiment, the induction grooves are provided for guiding introduced airflow toward the opposite side steps, and the flow rate of air to the trailing pad and head section is reduced. By doing this, the amount of contaminants collected near element units of the head section can be reduced, and damage to the magnetic disk can be suppressed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The shapes, sizes, etc., of the leading and trailing steps, induction grooves, and pads of the slider are not limited to the embodiments described herein and may be changed if necessary. This invention is not limited to femto sliders and may also be applied to pico sliders, pemto sliders, or other larger sliders. The number of magnetic disks used in the disk drive is not limited to one and may be increased as required.

What is claimed is:

1. A head comprising:
   a slider comprising a facing surface opposed to a surface of a rotatable recording medium; and
   a head portion on the slider, configured to record data on the recording medium and to reproduce data from the recording medium,
   the facing surface of the slider having a first direction along airflow and a second direction perpendicular to the first direction, the facing surface of the slider comprising:
   a leading step on an inflow side of the slider,
   a leading pad on the leading step,
   a pair of side steps extending from the leading step toward an outflow end of the slider and opposed to each other across a space in the second direction,
   side pads on the side steps that are continuous with the leading pad, individually,
   a trailing step on an outflow side of the slider, provided with the head portion, and
   induction grooves continuously extending from the leading pad to the side pads, individually, and configured to guide introduced airflow,
   wherein each of the induction grooves comprises an inflow end opening on the side of the leading step and an outflow end opening on the outflow end side of each corresponding side step, the inflow end being biased and located nearer to a central portion of the slider than the outflow end, and each induction groove extends inclined outwardly relative to the first direction.

2. The head of claim 1, wherein the leading step and each of the side steps comprise an outside edge which continuously extends in the first direction without comprising an opening.

3. The head of claim 1, wherein a width of each of the side steps in the second direction increases from an outflow end of the side step toward the leading step.

4. The head of claim 1, wherein a width of each of the induction grooves in the second direction is 6 to 30% of a width of the leading step in the second direction.

5. The head of claim 1, wherein each of the induction grooves is formed by connecting a plurality of grooves with different depths.

6. The head of claim 1, wherein each of the induction grooves is formed by connecting a first groove, a second groove deeper than the first groove, a third groove intermediate in depth between the first and second grooves, and a fourth groove shallower than the third groove, the grooves being sequentially arranged from an inflow end of the leading step toward an outflow end of each corresponding side step.

7. A head comprising:
a slider comprising a facing surface opposed to a surface of a rotatable recording medium; and
a head section on the slider, configured to record and reproduce data on and from the recording medium,
the facing surface of the slider having a first direction along airflow and a second direction perpendicular to the first direction,
the facing surface of the slider comprising
a leading step on an inflow side of the slider;
a leading pad on the leading step,
a pair of side steps extending from the leading step toward an outflow end of the slider and opposed to each other across a space in the second direction;
side pads on the side steps to be continuous with the leading pad, individually;
a trailing step on an outflow side of the slider, provided with the head section; and
induction grooves continuously extending from the leading pad to the side pads, individually, configured to guide introduced airflow,
the slider further comprising a center rail extending in the first direction from the leading step toward the trailing step and
a guide groove formed in the center rail to extend in the first direction.

8. The head of claim 7, wherein the leading step and each of the side steps comprise an outside edge which continuously extends in the first direction without comprising an opening.

9. The head of claim 7, wherein a width of each of the side steps in the second direction increases from an outflow end of the side step toward the leading step.

10. The head of claim 7, wherein a width of each of the induction grooves in the second direction is 6 to 30% of a width of the leading step in the second direction.

11. The head of claim 7, wherein each of the induction grooves is formed by connecting a plurality of grooves with different depths.

12. The head of claim 7, wherein each of the induction grooves is formed by connecting a first groove, a second groove deeper than the first groove, a third groove intermediate in depth between the first and second grooves, and a fourth groove shallower than the third groove, the grooves being sequentially arranged from an inflow end of the leading step toward an outflow end of each corresponding side step.

13. A disk drive comprising:
a drive unit configured to support and rotate a disk recording medium;
a head configured to record data on the recording medium and to reproduce data from the recording medium; and
a head actuator supporting the head, the head comprising a slider comprising a facing surface opposed to the recording medium and a head portion on the slider,
the facing surface of the slider having a first direction along airflow and a second direction perpendicular to the first direction,
the facing surface of the slider comprising
a leading step on an inflow side of the slider,
a leading pad on the leading step,
a pair of side steps extending from the leading step toward an outflow end of the slider and opposed to each other across a space in the second direction,
side pads on the side steps to be continuous with the leading pad, individually,
a trailing step on an outflow side of the slider, provided with the head portion, and
induction grooves continuously extending from the leading pad to the side pads, individually, and configured to guide introduced airflow,
wherein each of the induction grooves is formed by connecting a first groove, a second groove deeper than the first groove, a third groove intermediate in depth between the first and second grooves and a fourth groove shallower than the third groove the grooves being sequentially arranged from an inflow end of the leading step toward an outflow end of each corresponding side step.

14. The disk drive of claim 13, wherein the leading step and each of the side steps comprise an outside edge which continuously extends in the first direction without comprising an opening.

15. The disk drive of claim 13, wherein a width of each of the side steps in the second direction increases from an outflow end of the side step toward the leading step.

16. The disk drive of claim 13, wherein a width of each of the induction grooves in the second direction is 6 to 30% of a width of the leading step in the second direction.

17. The head of claim 13, wherein each of the induction grooves is formed by connecting a plurality of grooves with different depths.

18. The head of claim 17, wherein each of the induction grooves is formed by connecting a first groove, a second groove deeper than the first groove, a third groove intermediate in depth between the first and second grooves, and a fourth groove shallower than the third groove, the grooves being sequentially arranged from an inflow end of the leading step toward an outflow end of each corresponding side step.

* * * * *